June 30, 1970     W. G. COLE, JR     3,518,069
METHOD OF FORMING GLASS FIBERS
Filed Feb. 24, 1969     2 Sheets-Sheet 1
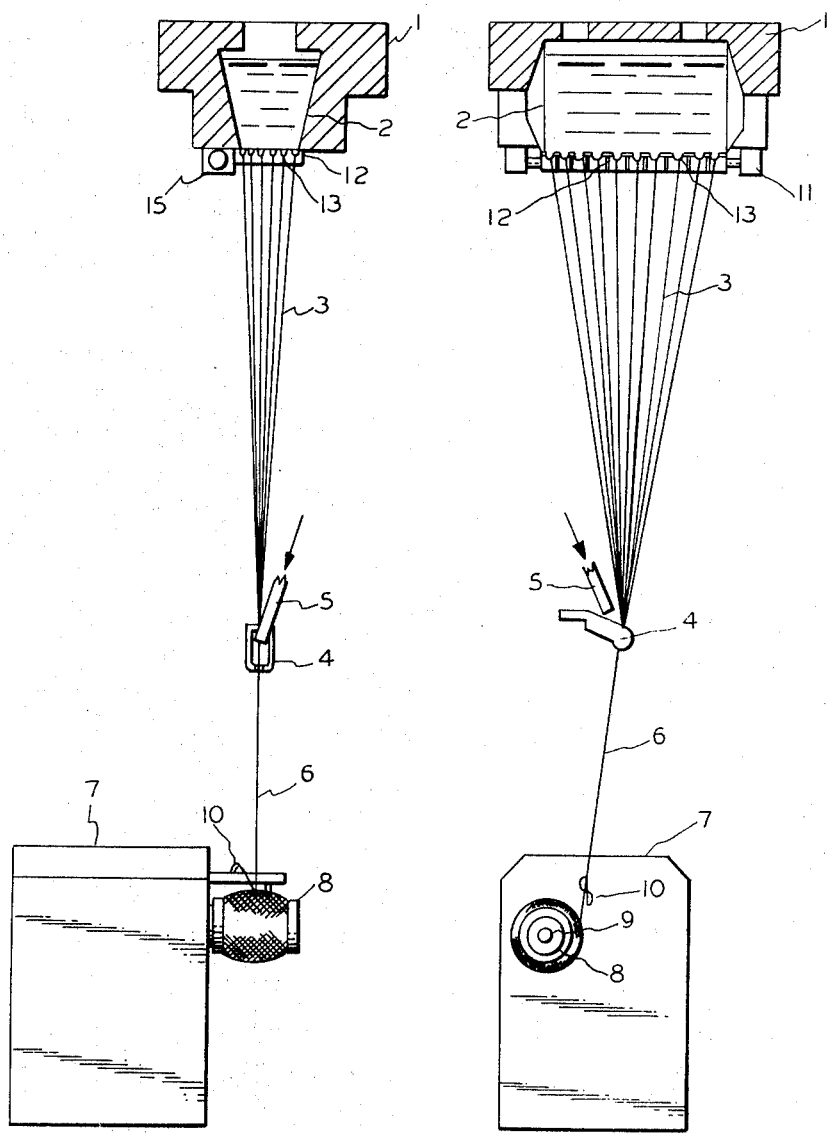
INVENTOR
WILLIAM G. COLE, JR.
BY
ATTORNEY June 30, 1970  W. G. COLE, JR  3,518,069
METHOD OF FORMING GLASS FIBERS
Filed Feb. 24, 1969  2 Sheets-Sheet 2

INVENTOR
WILLIAM G. COLE, JR.

BY *Wilton J. Simmons*

ATTORNEY

United States Patent Office 3,518,069
Patented June 30, 1970

3,518,069
METHOD OF FORMING GLASS FIBERS
William G. Cole, Jr., Nashville, Tenn., assignor to Ferro Corporation, Cleveland, Ohio, a corporation of Ohio
Continuation-in-part of application Ser. No. 546,027, Apr. 28, 1966. This application Feb. 24, 1969, Ser. No. 811,273
Int. Cl. C03b 37/07
U.S. Cl. 65—2                                    2 Claims

ABSTRACT OF THE DISCLOSURE

In an apparatus for the manufacture of glass monofilaments from a feeder of molten glass, a series of fluid-permeable, porous fins, with a source of fluid connected thereto, whereby a liquid coolant, preferably water, continuously fed to said fins, passes through the walls thereof by capillary action, and is evaporated from the surface thereof by the heat of the monofilaments being drawn from between said fins, to thereby provide a cooling effect in the area of said monofilaments.

---

This application is continuation-in-part of Ser. No. 546,027, filed Apr. 28, 1966, now abandoned.

The invention is described particularly in connection with the production of continuous glass fibers wherein streams of molten glass are attenuated mechanically into continuous fibers of small diameter which are then gathered into a strand and wound into a package. Fibers thus produced are then usually processed into other textile forms such as yarns, cords, roving, etc., on conventional textile machinery for subsequent use in ever-widening fields of application.

The art of attenuating glass monofilaments from a molten source thereof for subsequent reprocessing into intermediate or final items of commerce is well known and documented in the art; for example, see United States Pat. No. 2,908,036 to Russell, particularly columns 1 and 2 thereof and column 3 thereof lines 1–62 which are incorporated herein by reference. It will be apparent that the objectives of Russell are substantially the same as those of this invention, and these too are incorporated herein by reference.

Referring to the attached drawings, FIG. 1 is a side elevation view of a general layout of apparatus including shielding components for production of continuous glass fibers in accordance with the present invention;

FIG. 2 is a front elevation view of the apparatus of FIG. 1;

Figure 3:
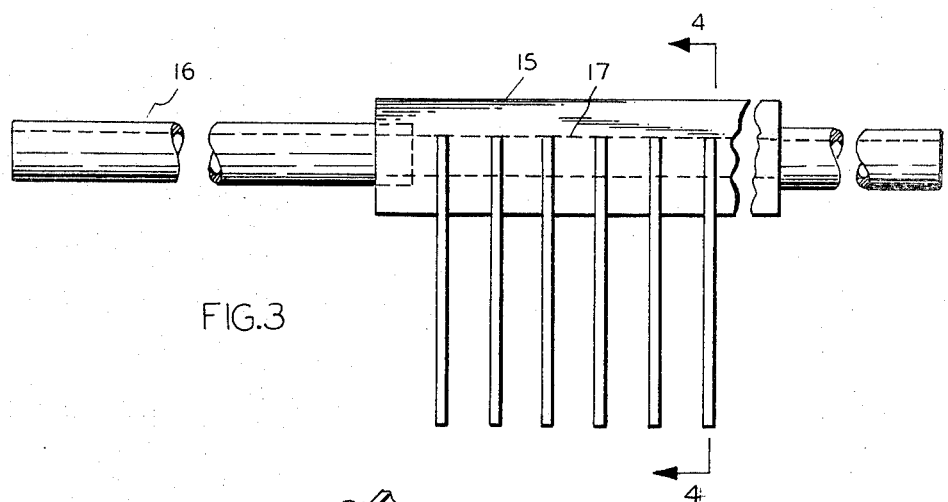
FIG. 3 is an enlarged plan view of the header and fins of the present invention.
Figure 5:
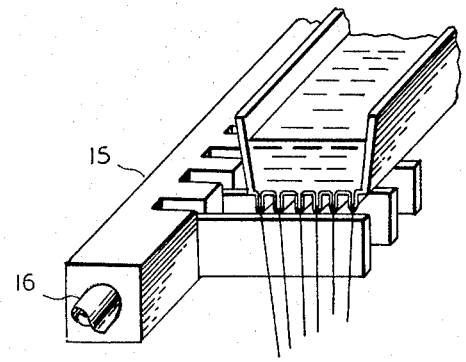
FIG. 5 is a perspective view of the instant cone shielding arrangement shown as positioned with respect to emergent cones of glass.

Referring now more particularly to the drawings, FIGS. 1 and 2 illustrate a refractory furnace 1 for reducing a body of glass to molten condition having a bushing of feeder 2 associated therewith from which a plurality of streams of molten glass are emitted from orifices in the feeder tips for attenuation into monofilament fibers 3. The fibers are drawn to a gathering member 4 at which they are gathered and at which sizing fluid may be applied to the fibers as it is supplied from a tube 5 connected to a reservoir not shown. The strand 6 formed of the gathered fibers is packaged by a winder 7 which collects a strand on a tube 8 mounted on a rotating collet 9 and traversed by a suitable traversing device such as a spiral wire traverse 10. The winder provides the force of attenuation for the fibers by reason of rotation of the collet which develops tension in each fiber to withdraw it from the molten glass flowing from the feeder. Each of said molten glass streams immediately upon emergence from said orifices, by virtue of said attenuating means, presents generally a coniform shape which converges, at its lower extremity, to a monofilament, which solidifies prior to the gathering point 4, where it joins other monofilaments to form a strand. A cone shielding unit 11 provides a plurality of shield members in the form of fluid-permeable, porous blade-like fins 12 each extending across the width of the feeder between feeder tips 13. The orientation of the thin blade-like fins 12 across the under part of the feeder with feeder tips aligned therebetween may be seen more clearly in FIGS. 4, 5 and 6, which illustrate that the tips 13 and the cones 14 (FIG. 6) emitted therefrom are, in effect, shielded from each other by said fins.

In the preferred embodiment shown, two rows of feeder tips 13, when viewed tranverse to the long axis of feeder 2, are embraced by a pair of fins, although this may be varied depending upon prevailing requirements and conditions at the time.

The fins 12 extend from a longitudinal, hollow, fluid-cooled manifold or header 15 disposed laterally with respect to the feeder structure. Cool water or other suitable liquid coolant is supplied continuously through said header by suitable means such as tubing or other conduct 16. Water, as a preferred fluid, is fed to one end of the header and passed through a hollow channel 17 therewithin, passing longitudinally through the header and emitted from the opposite outlet end at a slightly higher temperature, due to heat being absorbed during passage through the header, which in turn absorbs heat directly from the adjacent, molten glass cones and via communicating fins 12. The water can be passed through the channel 17 at a controlled rate of flow and at temperatures predetermined to establish desired temperature differentials between the fins and the glass emitted from the feeder tips.

Although mounting means is not shown, any suitable means, well known in the art, may be utilized for mounting the header and permeable fins of this invention, in such a manner that when in operating position, the fins 12 are so positioned that the upper edge of each is at a level slightly above the bottom of the tips with which it is associated while its bottom edge extends downwardly to the level of the apex of the cones emitted from the tip orifices.

As is well known, to assure uniformity of filamentation, the cone shields of this invention stabilize the cones from which monofilaments are attenuated by controlling absorption of heat from the glass on emergence from the feeder tip and to thereby promote a viscosity of the glass which promotes stability thereto during filamentation and by reducing the disrupting, erratic effects of air currents in the vicinity of the cones as may be caused by both variation in the glass and ambient temperatures and by motions of the glass itself as it rapidly passes into filamentation.

The composition of glasses suitable for the application of this invention are well known in the art and documented in prior patents, including the patent to Russell discussed above and need not be repeated here.

The improvement contemplated by this invention is the provision of stabilizing fins 12 composed of a fluid-permeable, porous material to thereby enhance and improve the stabilization and cooling qualities of a device of the general character herein described.

Figure 4:
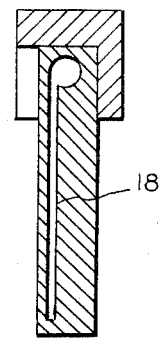
FIG. 4 is a section through 4—4 of FIG. 3.
Figure 6:
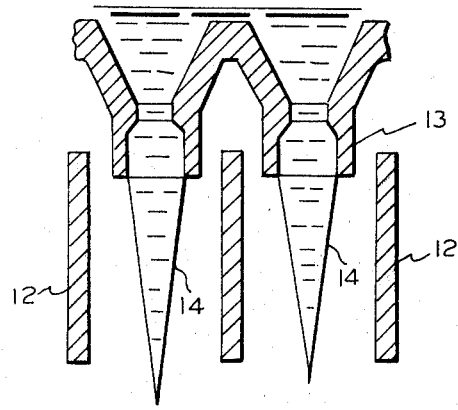
FIG. 6 is an enlarged cross sectional view of a pair of feeder tips with cone shielding fins on both sides of each tip.

Referring to FIGS. 4 and 6, linear opening 18, communicating with channel 17, will be seen to extend nearly the entire length of cooling fin 12. Fluid passing through channel 17 flows through opening 18 to thereby provide a head of fluid substantially the entire length of cooling fin 12. Cooling fin 12, being made of fluid-permeable, porous material, permits the rapid migration of fluid, by *capillary* action, aided by whatever pressure is developed in channel 17, to all exterior surfaces of said fin where, in addition to the cooling effect caused by conductance of heat away from the area of molten glass cones, the heat of the glass cones, in close proximity to the permeable fins, causes rapid and continuous evaporation of fluid from the surface therefrom thus providing an additional cooling effect.

As will be apparent from the foregoing disclosure, this invention contemplates that the liquid coolant will pass in liquid form, through the permeable fin structure, to the surface area thereof, for exterior evaporation.

It is contemplated that the porous, fluid-permeable fins of this invention may be constructed of any non-combustible, non- (readily) fusible substance through which water will travel either by capillary action, under any fluid pressure greater than atmospheric, to include metal and ceramic substances.

The fins may be composed of a ceramic material similar to ceramic filter materials used in many chemical processes, which fins may or may not have passage 18 extending therethrough. In the absence of a passage or similar source of supply of fluid to the internal structure of fin 12, a portion of fin 12 may be suitably fixed to a header and so designed that a large portion of said fin farthest from the cones would be completely submerged in a source of cooling fluid. The fin in this instance deriving its supply of water purely by capillary action maintained by continuous evaporation from the portion thereof in closest proximity to the hot, molten glass cones.

It is not absolutely essential that any holes or voids in the fins of this invention be of any particular size, as, depending upon the structure of the fin material, ambient temperature, liquid volatility, interstices of molecular size, or a series of straight or tortuous holes or openings of varying sizes will suffice.

Applicant's device may best be likened to well-known home humidifier devices, one in particular of which relies upon a series of vertical, porous ceramic T plates, the lower vertical member of a series of the T's being submerged in a pan of water, which has the water therein maintained at a given level, the cross bar of the T being exposed to the movement of air in a hot air furnace plenum for evaporation of water into the air stream for humidifying the area to be heated. Thus, the device of this invention, like T plates, is considered to be operably permeable, i.e., the rate of liquid passage through the fin members being a function of operating conditions.

If the furnace runs a great deal in cold weather, then the blower moving air over the T elements tends to evaporate a great deal of water.

On the other hand, on a relatively warm day, if the furnace operates only sporadically, then a much lesser amount of water would be evaporated from the T plates.

The critical feature of this device being that it is only necessary to maintain a *sufficient* supply of liquid by way of maintaining a level constant in an open reservoir thereof wherein the T elements were submerged.

In the device of this invention, there is required only a minimum, *adequate* supply of liquid under pressure to the fin elements, and the rate at which the water passes through them is directly proportionate to the rate at which the water is evaporated from the surface thereof which will, in turn, vary with the temperature of the glass being drawn, the ambient atmosphere temperature, etc.

The passage of the liquid of this invention may also be likened to water moving up into a blotter submerged in a reservoir of liquid. Once the blotter is soaked, through capillary action, whatever water it continues to pick up from its source is dependent upon the rate at which the water is evaporated from its surface.

The fluid-permeable porosity of the fin material of this invention may generally be described as that which, if said material were formed into a horizontal diaphragm with any head of water thereabove which would exert a pressure greater than atmospheric, would permit water to migrate therethrough to the opposite surface. Obviously, porosity and permeability would be readily adjustable by selecting a more, or less, dense structure depending upon the rate at which heat is to be removed from the cone area, fluid pressure in channel 17, etc.

While I have shown passage 18 along the internal structure of fin 12, such passage could be situated adjacent the upper or lower edge of said fin, more than one passage could be provided, or water could be permitted to flow to said fin via a concave groove along the top edge thereof, hence to migrate through the interior and to the surfaces of said fin through the force of gravity and by capillary action.

Having thus described my invention, I claim:

1. In the method for producing filaments of glass, comprising drawing hot filaments of said material from a heated, plastic source thereof, the improvement in said method comprising the steps of:
   (a) maintaining a constant supply of vaporizable liquid,
   (b) confining said vaporizable liquid in a liquid-permeable member,
   (c) continuously passing said liquid, in liquid form, through said liquid-permeable member in an amount sufficient to continuously wet the outer surface of said member,
   (d) exposing said liquid, immediately following step (c) above, to the heat of said filaments as they emerge from said heated source,
   (e) utilizing the heat of said emergent filaments to continuously evaporate said liquid concurrently with step (d) above,
to thereby effect an improved degree of cooling of said filaments as they are being drawn.

2. The method of claim 1 wherein said liquid is water.

References Cited

UNITED STATES PATENTS 3,155,476 11/1964 Drummond _____ 65—12
3,345,147 10/1967 Russell _____ 65—12 XR S. LEON BASHORE, Primary Examiner R. L. LINDSAY, Jr., Assistant Examiner U.S. Cl. X.R.

65—12